Feb. 19, 1963 D. A. BUNDRICK 3,077,689
PAYMENT REMINDER DEVICE FOR SELF-SERVICE RACKS
Filed Aug. 8, 1960
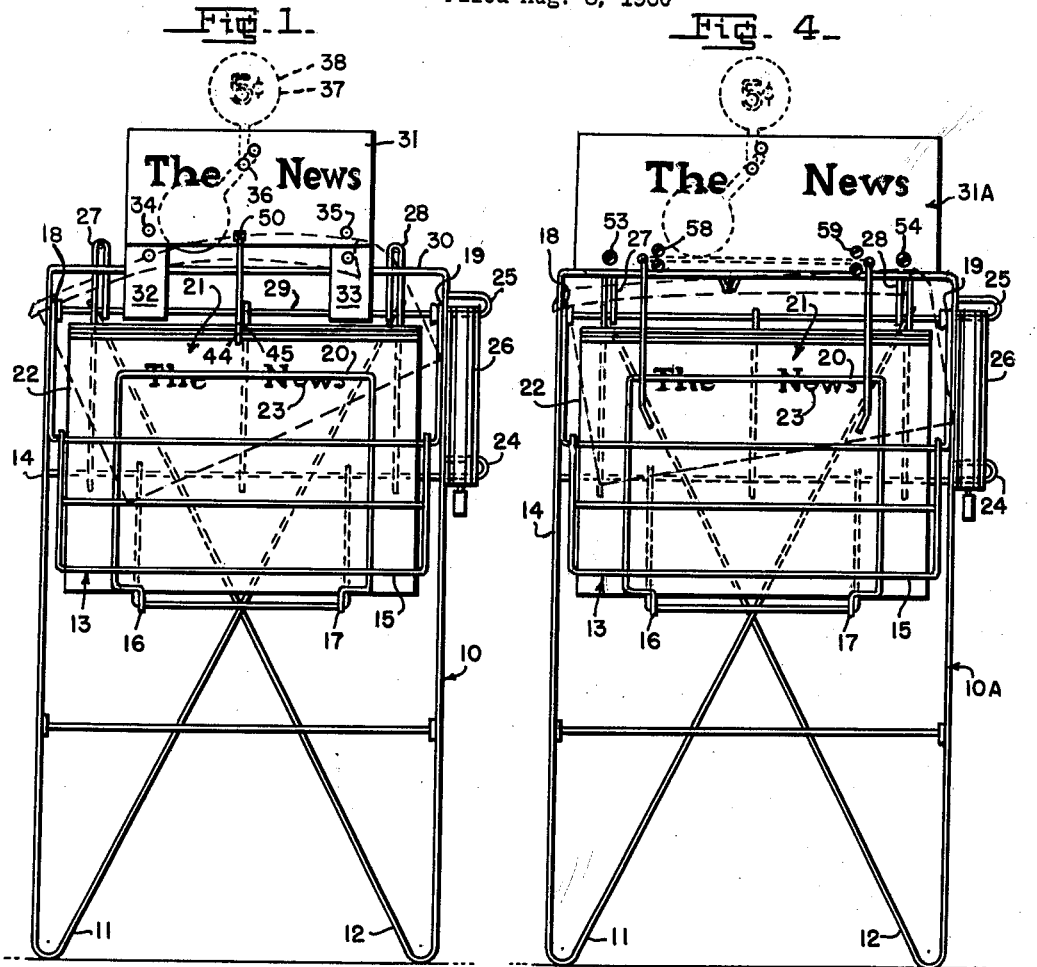
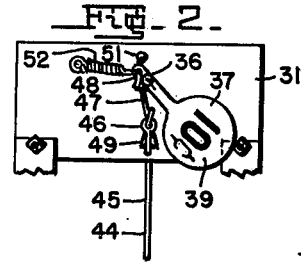
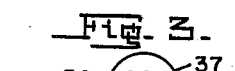
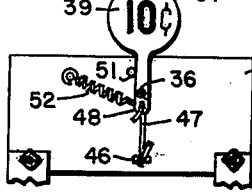
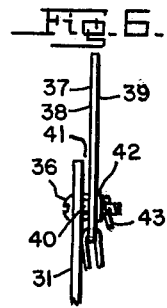
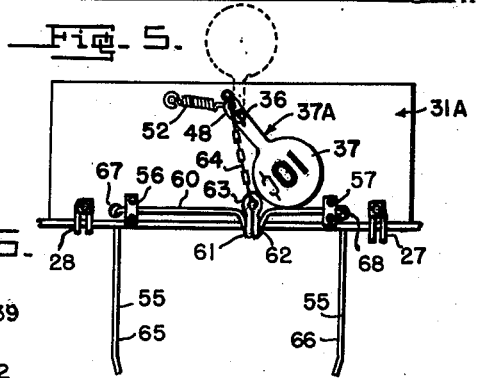
INVENTOR.
Daniel A. Bundrick
BY
Franklin W. Durgin
AGENT.

United States Patent Office 3,077,689
Patented Feb. 19, 1963

3,077,689
PAYMENT REMINDER DEVICE FOR SELF-
SERVICE RACKS
Daniel A. Bundrick, P.O. Box 1152, Sarasota, Fla.
Filed Aug. 8, 1960, Ser. No. 48,159
5 Claims. (Cl. 40—308)

The present invention relates to improvements in self-service article vending stands relying on the honor system for payment by the self-serving customer, and more specifically to improved self-service newspaper racks relying on the honor system of payment assisted by a payment reminder device.

An important object of the present invention is to provide a self-service newspaper rack relying on the honor system for payment and equipped with a payment reminder device actuable by the customer during removal of a newspaper from the rack.

Another important object of the invention is the provision of a self-service newspaper rack of the honor system type equipped with a normaly concealed payment reminder sign which is moved into the customer's view during removal of a newspaper from the rack.

A further object of the invention is the provision of a self-service rack for supplying daily newspapers under the honor system at a given price on weekdays and Sunday newspapers at a higher price over week-ends and which is equipped with a payment reminder device adjustable to display the correct price for the daily and Sunday newspapers.

A still further object of the invention is to provide a payment reminder device which may be attached as an accessory to existing conventional self-service honor system newspaper racks without material modification of the existing racks and at a very low cost.

Other objects and advantages of the invention will become apparent during the course of the following detailed description, taken in connection with the accompanying drawing, forming a part of this specification, and in which drawing:

FIG. 1 is a front elevational view of an existing conventional self-service newspaper rack relying on the honor system for payment and equipped with a single actuator type payment reminder sign, the broken lines showing two positions of the payment reminder sign.

FIG. 2 is a fragmentary view of the upper portion of the self-service newspaper rack in rear elevation and showing the payment reminder sign in its lowered normally concealed position.

FIG. 3 is a view similar to FIG. 2 but showing the payment reminder sign in its elevated and exposed position.

FIG. 4 is a front elevational view of an existing conventional self-service newspaper rack having a nameplate somewhat wider than that of FIG. 1 and equipped with a dual actuator type payment reminder sign.

FIG. 5 is a fragmentary rear elevational view of the upper portion of the rack shown in FIG. 4 and illustrating in full and broken lines the normally concealed and exposed positions respectively of the payment reminder sign.

FIG. 6 is a fragmentary view in end elevation of the upper portion of the rack shown in FIGS. 1-3 with the payment reminder sign in its elevated and exposed position.

In the drawing which, for the purpose of illustration, shows preferred and modified forms of the invention and wherein similar reference characters denote corresponding parts throughout the views, the numeral 10 generally designates an existing conventional self-service newspaper rack relying on the honor system for payment and being formed mainly of heavy gauge steel wire. Supported on wire legs 11, 12 is a pocket-like receptacle 13 including a wire back 14 and a wire front 15 hingedly connected to the back 14 at joints 16—19 enabling the top portion 20 of the front 15 to be swung forwardly so as to form a long narrow combined entrance and exit 21 for newspapers 22. With this conventional construction, a pack or bundle of newspapers 22 may be dropped into the pocket-like receptacle 13 with the individual newspapers 22 standing upright so that the name 23 on the forward newspaper may be observed and so that a customer may grasp the outer newspaper and draw it upwardly out of the pocket-like receptacle 13.

Secured to a pair of vertically spaced wire loops 24, 25 forming an integral part of the wire frame back 14 is a tubular bank 26 for receiving coins in payment for newspapers purchased under the honor system.

Extending upwardly from the wire rack 14 are integral wire loops 27, 28 for attachment of a rearwardly disposed, upwardly extending nameplate bearing the name of the newspaper. The frame back 14 includes two vertically spaced horizontal wires 29, 30 as an optional means of attachment for the nameplate. In the example shown in FIG. 1, the nameplate 31 is narrower than the spacing of the upwardly projecting wire loops 27, 28 and consequently it is more convenient to rigidly secure same in a vertical position over the wire back 14 by sheet metal strips 32, 33 extended around the two upper horizontal wires 29, 30 and fastened to the nameplate 31 as by bolts or rivets 34, 35.

Pivotally mounted at the back of the nameplate 31 for swinging movement between a normally concealed and downwardly disposed position and an elevated exposed position, as by a bolt 36 passing through the plate 31 is a payment reminder sign 37 having one face 38 displaying the price of daily newspapers and another face 39 displaying the generally higher price of Sunday newspapers. Referring to FIG. 6, the pivot bolt 36 may be effectively held against casual displacement from the nameplate 31 by means of a back nut 40 which also serves to provide an operating clearance space 41 between the payment reminder sign 37 and the nameplate 31. In order to facilitate turning of the sign, any quickly removable fastening means such as a washer 42 and cotter pin 43 may be used to hold the payment reminder sign 37 on the pivot bolt 36.

Extending through the lower margin of the nameplate 31 and fulcrumed thereto is a heavy guage wire or rod 44 having a forward end portion 45 passing over the newspaper exit or outlet passageway 21 at the upper end of the pocket-like receptacle 13. The other end of this wire or rod 44 terminates in an eye 46 connected by a link 47 to a pull arm 48 on the payment reminder sign 37 beyond the pivot 36. The wire or rod 44 may be provided with lateral projections or lugs 49 as by pinching so that when the wire or rod 44 is fulcrumed in the plate 31 these lugs 49 will loosely engage the back of the plate 31. Forwardly of the plate 31, the wire or rod 44 is loosely held in its fulcrumed position by a suitable enlargement thereon such as a nut 50. This construction permits the wire or rod 44 to be swung straight up or upwardly and sidewardly in either direction. Secured to the plate 31 is a rearwardly projecting stop pin 51 limiting swinging movement of the payment reminder sign 37 to its uppermost or vertical position shown in FIG. 3. This stop pin 51 also limits downward travel of the payment reminder sign 37 beyond the position shown in FIG. 2. The payment reminder sign 37 will normally fall by gravity from its exposed position shown in FIG. 3 to the concealed position shown in FIG. 2 but if desired a spring 52 may be connected between the sign 37 and the plate 31 to urge the sign 37 toward the concealed position. With this construction the sign 37 is biased toward the concealed position by gravity and by spring means 52 and in the appended claims reference to biasing of the payment reminder sign 37 toward its concealed position is intended to include biasing by gravity, biasing by resilient means or both.

In the operation of the form of invention shown in FIGS. 1–3, a customer in lifting up one of the newspapers 22 in order to remove same will bring the newspaper into engagement with the forwardly projecting end portion 45 of the fulcrumed wire or rod, elevating same and this will lower the ring 46 rearwardly of the plate 31 thus pulling downwardly on the link 47 and swinging the payment reminder sign 37 upwardly to its exposed position as shown in FIG. 3. The customer will naturally observe the movement of the sign 37 into its exposed position and will normally read the indicia appearing thereon, which indicia may include the price of the current edition of the newspaper offered for sale at that time and will normally deposit a coin of correct denomination in the tubular bank 26. Loosely fulcruming the actuating rod 44 in the nameplate 31 permits the customer to withdraw the newspaper 22 in any one of a number of upward directions without undue interference.

Referring now to the form of invention shown in FIGS. 4 and 5, the self-service stand or rack 10A therein shown is the same as the rack 10 shown in FIG. 1 except that it is equipped with a wider nameplate 31A which is bolted at 53 and 54 to the upstanding wire loops 27, 28. Mounted on the back of the nameplate 31A is a payment reminder device 37A including a sign 37, pivot bolt 36 and spring 52 corresponding to those in FIGS. 1–3 but provided with a dual actuator lever 55 instead of the single actuator lever 44 of FIGS. 1–3. Mounted for rotary oscillation on the rear surface of the nameplate 31A as by spaced sheet metal holding strips 56, 57 and self-threading sheet metal screws 58, 59 is a wire shaft 60 provided with a laterally bent intermediate portion 61 forming an arm 62 terminating in an eye 63 that is connected to the pull arm 38 of the sign 37 as by a fine chain 64. The ends of the wire shaft 60 are bent at right angles to form spaced apart lateral arms 65, 66 that extend through holes 67, 68 in the lower margin of the nameplate 31A and pass over the newspapers 22 in the rack 10A in the same manner as the single actuator arm 45 in FIG. 1, except that the dual actuator arms 65, 66 are disposed over the opposite halves of the newspaper 22 instead of centrally thereof. The operation of the modified form of invention shown in FIGS. 4 and 5 is the same as that of FIGS. 1–3 in that upward withdrawal of one of the newspapers 22 from the rack 10A will engage the dual actuator arms 65, 66, moving same upwardly with a resultant lowering of the eye 63 rearwardly of the nameplate 31A and downward pull of the chain 64 so as to impart upward swinging movement of the sign 37 into its exposed position. However, by providing dual actuating arms 65, 66 a somewhat quicker action of the payment reminder device 37A may be obtained inasmuch as the normal practice by the customer of tilting the newspaper 22 to one side or the other when withdrawing same from the rack 10A will result in quicker engagement of one or the other of the dual actuating arms 65, 66.

A plurality of differently shaped payment reminder signs may be used interchangeably for different occasions and may display appropriate indicia other than or in addition to the price markings.

Various other changes may be made in the forms of invention herein shown and described without departing from the spirit of the invention and the scope of the following claims.

What is claimed is:

1. A self-service rack for newspaper and magazine type articles including a rearwardly disposed, upwardly extending plate and means embracing a pack of said articles in upright position and providing an exit for separate removal of said articles, a payment reminder device mounted on the rack for movement between exposed and concealed positions relative to said plate, said device normally biasing itself toward said concealed position, a lever fulcrumed on said rack having a portion normally extending across said exit, and a link connected between the lever and said payment reminder device whereby pressure against said lever portion incident to removal of one of said articles from the rack will urge said device toward its exposed position.

2. A self-service rack for selectively serving daily and Sunday newspapers of different prices on week-days and Sundays respectively, including a rearwardly disposed, upwardly extending plate and means embracing a pack of said newspapers in upright position and providing an exit for separate removal of said newspapers, a payment reminder sign having opposite sides, one displaying the price of the daily newspapers and the other displaying the price of the Sunday newspapers, means removably and reversibly mounting said sign on the rack for movement between exposed and concealed positions relative to said plate, said sign being biased toward said concealed position, a lever fulcrumed on said rack having a portion normally extending across said exit, and a link removably connected between the lever and said sign to permit removal and reversal of the sign and whereby pressure against said lever portion incident to removal of one of said newspapers from the rack will urge said sign toward its exposed position.

3. A self-service rack for newspapers comprising means embracing a pack of newspapers in upright position, said embracing means providing a narrow overhead exit of a width slightly greater than the width of the newspapers and defining a path of upward travel for newspapers as they are separately removed from the rack by individual self-service customers, a payment reminder sign mounted on the rack for movement between spaced positions, said sign normally being biased toward one of said spaced positions, and means including a plurality of elements normally spaced along said narrow exit in said path of travel operable to move said sign toward the other of said spaced positions responsive to a customer's removal of a newspaper from the rack and resultant upward engagement of the newspaper with at least one of said elements.

4. A self-service rack for newspapers comprising a rearwardly disposed, upwardly extending plate and newspaper supporting means provided with an exit passageway defining a path of travel for newspapers being separately removed from the rack by individual self-service customers, a payment reminder sign mounted on the rack for movement between exposed and concealed positions relative to said plate, said sign being biased toward said concealed position and means including an element normally disposed in said path of travel acting to move said sign toward said exposed position through engagement of one of said newspapers with said element incident to removal of said newspaper from the rack.

5. A self-service rack for newspapers comprising newspaper supporting means provided with an exit passageway defining a path of travel for newspapers being separately removed from the rack by individual self-service customers, a plate normally substantially vertically fixed on the rack, a payment reminder sign mounted on the plate rearwardly thereof for movement between a down position in which the sign is concealed by the plate and an up position relative to the plate and in which the sign is exposed to the customers' view, said sign being biased toward the down position of concealment by the plate, and means carried by the plate including a lever arm normally disposed in the path of travel of said newspapers for elevating said payment reminder sign to its exposed position responsive to a customer's removal of a newspaper from the rack.

References Cited in the file of this patent

UNITED STATES PATENTS

| | | |
|---|---|---|
| 942,203 | Haywood | Dec. 7, 1909 |
| 945,488 | Pulver | Jan. 3, 1910 |
| 2,551,915 | Turner | May 8, 1951 |
| 2,745,557 | Martin et al. | May 15, 1956 |
| 2,798,320 | Montalto | July 9, 1957 |